Feb. 10, 1970     U. SCHMIDT ETAL     3,495,091
OPTICAL DIGITAL DEFLECTION DEVICE FOR SCANNING AN
OBJECT LIKE A CAMERA

Filed Sept. 9, 1966     2 Sheets-Sheet 1

INVENTORS
UWE SCHMIDT
K.J. SCHMIDT-TIEDEMANN
BY
AGENT

United States Patent Office 3,495,091
Patented Feb. 10, 1970

3,495,091
OPTICAL DIGITAL DEFLECTION DEVICE FOR SCANNING AN OBJECT LIKE A CAMERA
Uwe Schmidt, Hamburg-Wandsbek, and Karl Joachim Schmidt-Tiedemann, Rellingen, Germany, assignors, by mesne assignments, to U.S. Philips Corporation, New York, N.Y., a corporation of Delaware
Filed Sept. 9, 1966, Ser. No. 578,333
Claims priority, application Germany, Oct. 22, 1965, P 37,941
Int. Cl. G02f 1/18
U.S. Cl. 250—225    4 Claims

ABSTRACT OF THE DISCLOSURE

An optical digital deflection device for the purpose of scanning, like a camera, a self-illuminating or illuminated object is disclosed. This device is provided with a first lens between the object and the device for converting a diverging light beam into a beam of parallel rays, a photodetector for converting a beam of light focussed on it into an electrical signal and arranged on the side opposite where the first lens is provided, a second lens arranged between the device and the photodetector for focussing a central beam of parallel rays into the photodetector. The entrance surface of the device is so large that each beam of parallel rays emitted from the object being scanned, and converted by the first lens, falls within that entrance surface.

The present invention relates to an arrangement for picking up the light radiation emitted by individual points of an object in which at least one photosensitive element is used.

The invention has for its object to provide an arrangement which operates with purely electronic means while the use of any mechanically driven elements is avoided, which results in that very rapid scans and deflections can be obtained which correspond, for example, with the television standards.

The arrangement in accordance with the invention is characterized in that between the object and the photosensitive element there is provided a digital light deflector which is controlled by an electric generator, while between the object and the deflector provision is made of a first lens which converts the diverging beams of rays emitted by the various image points into parallel beams of rays, a second lens being provided between the deflector and the photosensitive element by which the beam of rays emanating from the deflector is focussed onto the photosensitive element, and whereby a signal is derived from said element.

The invention is based on the recognition of the fact that a digital light deflector known per se from the British patent specification 994,955 is capable of deflecting with the same accuracy both a light beam of very large diameter and a light beam of very small diameter. As is apparent from the said British patent specification, such a digital deflector consists of a plurality of units. Each unit is composed of a polarization switch and an associated prism. The polarization switch may be constituted by a Pockel cell or a Kerr cell which is controlled by suitable voltages. As will be explained hereinafter, the surface of the prism and the polarization switch of at least that unit at which the light beam to be deflected enters must be so large that the incident light beam can never fall outside this surface.

These digital deflection devices have the great advantage that deflection is always effected at separate points, since the angle of deflection only depends upon the two indices of refraction of the prisms consisting of bi-refractive material and not upon the voltages applied to the polarization switches of the various units.

The present invention can be used not only for television purposes but in any cases in which externally illuminated or self-luminescent objects or images must be scanned.

In order that the invention may be readily carried into effect, it will now be described more fully, by way of example, with reference to the accompanying drawing, in which.

Figure 1:
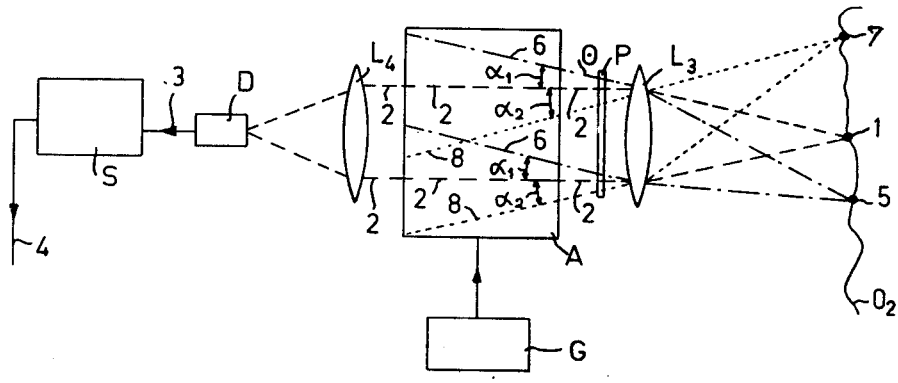
FIG. 1 shows an arrangement operating like a television camera.

In FIG. 1, $O_2$ denotes a self-luminescent or illuminated object which must be scanned by means of an arrangement in accordance with the invention. Let it be assumed that the point 1 at the centre of the image $O_2$ enters the digital deflection device A through a lens $L_3$ in the form of a parallel beam of rays 2. This parallel beam of rays is polarized in a polarizer P so that the light is polarized in a given direction, for example, in the point direction indicated at the polarizer P. This beam of rays 2 is not deflected in the deflector A owing to the fact that no voltages are applied to the deflection device A by the control device G in this case. This non-deflected beam of rays 2 leaves the deflector A on the side of the lens $L_4$ and is focussed by this lens $L_4$ in its focal point in which the photodetector D is arranged. This means that the point 1 is projected in the photodetector D. The photodetector D may take the form of a photocell or of a light-dependent resistor. In accordance with the brightness of the point 1, the photodetector D supplies a voltage which reaches the amplifier S via the conductor 3, which amplifier amplifies the signal and passes it on through the conductor 4 to amplifier and transmitter circuits provided on the camera side.

A point 5 of the image $O_2$ is converted by the lens $L_3$ into a parallel beam of rays 6 which is at an angle $\alpha_1$ to the beam of rays 2 and which in the absence of the deflector A would therefore strike only in part the lens $L_4$ and would not strike at all the photodetector D. However, such a voltage is applied by the generator G to the deflector A that the beam of rays 6 is deflected through an angle $\alpha_1$ so that it coincides again with the beam of rays 2 and this beam of rays also reaches via the lens $L_4$ the photodetector D.

This means that when various voltages are successively applied from the generator G to the deflector A, all the points of the image $O_2$ lying between the points 1 and 5 can be projected onto the photodetector D so that this photodetector successively, that means one after the other as determined by the voltages also applied one after the other from generator G to deflector A, supplies electric signals which correspond with the light intensities of the points lying between the points 1 and 5. In other words it can be said that points 1 to 5 are scanned one after the other due to the voltage as delivered by generator G.

This also applies to the point 7 of the image $O_2$. This point 7 is converted by the lens $L_3$ into a beam of rays 8 which is at an angle $\alpha_2$ to the beam of rays 2. When suitable voltages are applied by the generator G to the deflection device A, the beam of rays 8 can also be deflected through an angle $\alpha_2$ so that the beam of rays 8 also coincides again with the beam of rays 2 and is therefore again projected onto the photodetector D. Thus, when the desired voltages are applied by the generator G to the deflection device A, all the points lying between the points 1 and 7 can also be scanned in order of succession.

Although FIG. 1 only shows the scanning in vertical direction, it should be appreciated that a horizontal scanning can be effected also in the same manner. For this purpose, the deflection device A must include units which, as has been described in the British patent specification 994,955, are provided with prisms which are constructed so that they can bring about a deflection in horizontal direction. By means of such a type of deflection device A, the image $O_2$ can be scanned both in horizontal and in vertical direction so that the photodetector D has successively applied to it light intensities originating from the various points of the image $O_2$.

Figure 2:
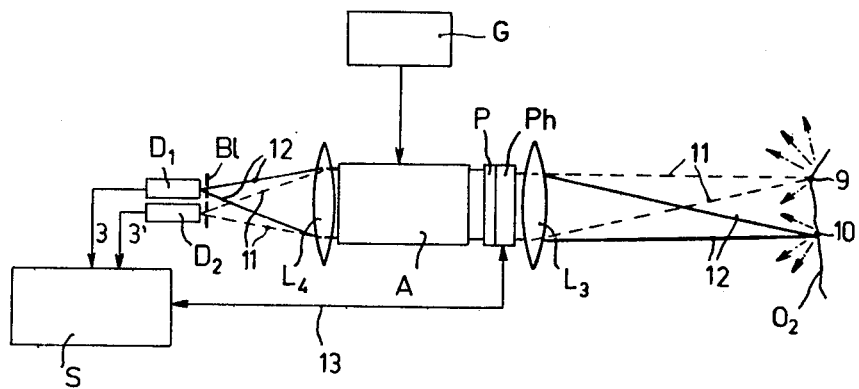
FIG. 2 illustrates an arrangement for measuring points of a self-luminescent or illuminated object.
Figure 3:
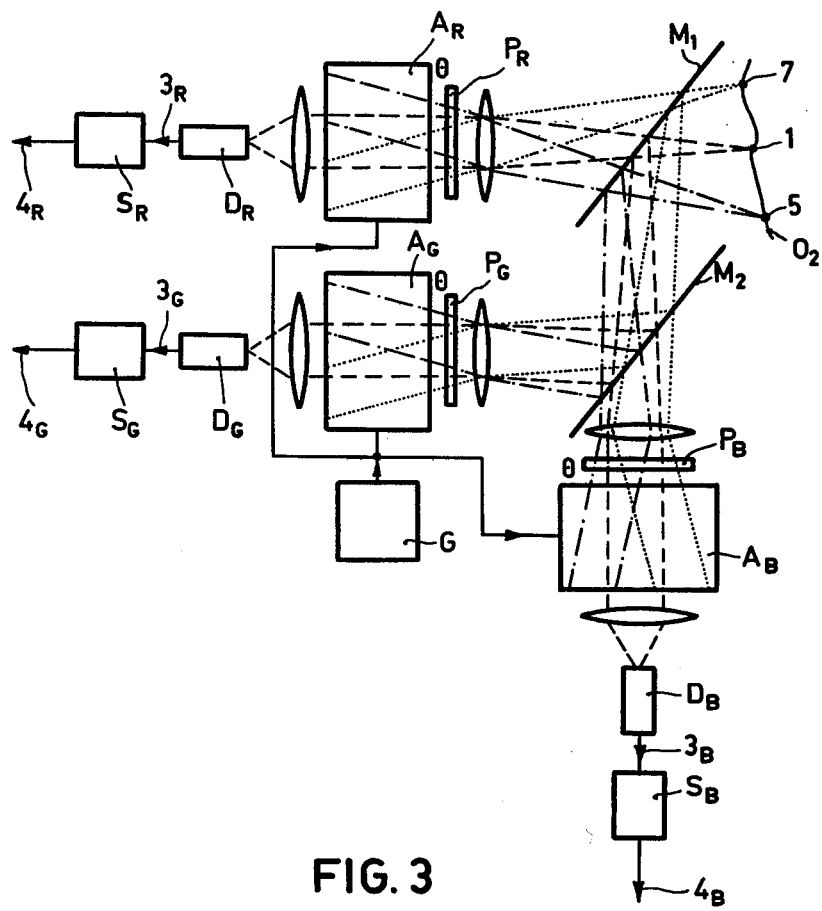
FIG. 3 shows another embodiment of the invention suitable for color images.

Whereas the arrangement shown in FIG. 1 is suitable for scanning an image $O_2$ so that this arrangement can be considered as a television camera, the arrangement shown in FIG. 2 is suitable for comparing the intensities of two points of an image. In FIG. 2, for example, the points 9 and 10 must be compared with one another. Point 9 emits a beam of rays 11 which is projected by the lenses $L_3$ and $L_4$ onto the photodetector $D_2$ without a voltage being applied by the generator G to the deflector A. Likewise, point 10 emits a beam of rays 12 which reaches the photodetector $D_1$ without voltages being applied to the deflection device A. Conductors 3 and 3' extend from the photodetectors $D_1$ and $D_2$ to the amplifier S which in this case has the form of a measuring device for comparing with one another the two signals originating from the conductors 3 and 3'. In case no voltages are derived from the generator G, the points 9 and 10 are consequently compared with one another in the amplifier S. It should be appreciated that as soon as voltages are applied by the generator G to the deflection device A, two other points of the image $O_2$ can be compared with one another. Consequently, this arrangement provides a measuring instrument by means of which two points of an image, for example, the luminescent screen of a television display tube, can always be compared with one another. This is desirable, for example, if a check is required as to whether various points of a screen of a display tube have the same intensities. In the arrangement shown in FIG. 2, a shutter B1 is provided in front of the photodetectors $D_1$ and $D_2$. This shutter B1 may efficaciously be provided with two adjustable apertures which each pass light for a photo-cell so that this shutter permits of obtaining a satisfactory separation of the two beams of rays.

It should be appreciated that if more than two points of an image should be compared with each other, more than two photodetectors D can be arranged behind the lens $L_4$ and the shutter B1.

It will also be evident that if the image $O_2$ is a coloured image, such a coloured image can be scanned by means of several arrangements of the type shown in FIG. 1. In this case, the image $O_2$ must be split up in known manner by means of two dichroic mirrors $M_1$ and $M_2$ into three images. The first, for example blue light beam, is processed in a first deflection device $A_B$, the second, for example green light beam, in a second deflection device $A_G$ and the third, for example, the red light beam in a third deflection device A. The three photodetectors $D_B$, $D_G$ and $D_R$ are arranged behind the three deflection devices $A_B$, $A_G$ and $A_R$ and supply the blue $4_B$, the green $4_G$ and the red $4_R$ signal, respectively. It must only be ensured that the various deflection devices $A_B$, $A_G$ and $A_R$ are provided with suitable polarization switches and prisms, that is to say that these polarization switches and prisms must be adapted to the various frequencies of the blue, green, and red beams of rays split by means of the mirrors $M_1$ and $M_2$. The voltages for the three deflection devices however can be delivered by a single generator G so that the deflections thereof are in synchronism with each other.

Finally, it should be noted that the arrangement of FIG. 2 includes a phase shifter $Ph$ to which a signal is applied through the conductor 13 from the signal-processing device S. For in certain cases, the light emitted by the object $O_2$ already has a given direction of polarization. If this direction of polarization does not correspond with the direction passed by the polarizer P, this results in an undesirable attenuation of the intensity of the incident beam of rays. In order to avoid this phenomenon, the phase shifter $Ph$ has applied to it a voltage which shifts the direction of polarization so that it coincides again with the direction passed by the polarizer P, that is to say that the conductor 13 is a feedback conductor which ensures that the signal supplied by the photo-sensitive elements $D_1$ and $D_2$ is at a maximum. Of course, it is possible to provide the arrangement of FIG. 1 also with the phase shifter $Ph$ and the conductor 13 so that also in this arrangement the photo-element D always supplies a signal of maximum amplitude.

What is claimed is:

1. An arrangement for comparing two image points of a self-luminescent object in which two photo-sensitive elements are used, comprising between the object ($O_2$) and two photo-sensitive elements ($D_1$ and $D_2$), a digital light deflector (A) which is controlled by an electric generator (G), a first lens ($L_3$) between the object ($O_2$) and the deflector (A) which converts the diverging beams of rays emitted by the various image points (1, 5, 7 and 9, 10 respectively) into parallel beams of rays, and a second lens ($L_4$) between the deflector (A) and the photosensitive elements ($D_1$ and $D_2$) by which the beam of rays emanating from the deflector (A) are focussed on the photosensitive elements ($D_1$ and $D_2$) which are positioned in the focal plane at lens ($L_4$) while the elements ($D_1$ and $D_2$) deliver an electrical signal.

2. An arrangement as claimed in claim 1, in which a shutter (B1) is provided between the second lens ($L_4$) and the two photo-sensitive elements.

3. An arrangement as claimed in claim 1, in which for scanning a colored object three digital deflection devices are provided to each of which a photosensitive element is added, while dichroic elements are provided between the object and the deflectors for splitting up the light emitted by the object into three beams of rays of different frequencies which are each applied to a deflection device adapted to deflect the light of a given frequency.

4. An arrangement as claimed in claim 1 in which a polarizer is arranged on the side of the deflection device where the beam of rays enters, and between the polarizer (P) and lens ($L_3$) there is provided a phase shifter ($Ph$) to which a signal is applied which is derived from a signal-processing device (S).

References Cited

UNITED STATES PATENTS

| | | | |
|---|---|---|---|
| 2,072,419 | 3/1937 | Birch-Field | 178—6 |
| 2,155,660 | 4/1939 | Jeffree | 178—7.3 |
| 2,513,520 | 7/1950 | Rosenthal | 178—5.4 |
| 3,303,276 | 2/1967 | Haeff | 178—5.4 |
| 2,562,181 | 7/1951 | Frommer | 250—208 |
| 2,933,972 | 4/1960 | Wenking | 88—14 |
| 3,003,388 | 10/1961 | Hunter et al. | 250—226 |
| 3,290,619 | 12/1966 | Geusic et al. | 350—150 |

JAMES W. LAWRENCE, Primary Examiner

DAVID O'REILLY, Assistant Examiner

U.S. Cl. X.R.

178—7.3; 250—226; 350—150